United States Patent
Hoffmann et al.

(10) Patent No.: US 8,476,857 B2
(45) Date of Patent: Jul. 2, 2013

(54) DEVICE FOR SUPPLYING ENERGY TO A LONG STATOR WINDING HAVING MULTIPLE WINDING SECTIONS

(75) Inventors: Reinhard Hoffmann, Erlangen (DE); Alfred Weller, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 397 days.

(21) Appl. No.: 12/742,933

(22) PCT Filed: Nov. 10, 2008

(86) PCT No.: PCT/EP2008/065216
§ 371 (c)(1),
(2), (4) Date: May 14, 2010

(87) PCT Pub. No.: WO2009/062906
PCT Pub. Date: May 22, 2009

(65) Prior Publication Data
US 2010/0253251 A1    Oct. 7, 2010

(30) Foreign Application Priority Data
Nov. 14, 2007  (DE) .......................... 10 2007 055 020

(51) Int. Cl.
    H02P 27/00    (2006.01)
    H02P 7/00     (2006.01)
    B60L 13/04    (2006.01)
    B60L 13/00    (2006.01)

(52) U.S. Cl.
    USPC ............ 318/438; 318/135; 104/281; 104/292

(58) Field of Classification Search
    USPC .......................... 318/135, 438; 104/281, 292
    See application file for complete search history.

(56) References Cited

U.S. PATENT DOCUMENTS

| | | | |
|---|---|---|---|
| 4,303,870 A | 12/1981 | Nakamura et al. | |
| 4,840,125 A * | 6/1989 | Lueers | 104/292 |
| 5,569,987 A | 10/1996 | Fischperer | |
| 5,712,514 A | 1/1998 | Fischperer et al. | |
| 6,411,049 B1 | 6/2002 | Fischperer | |
| 7,362,014 B2 | 4/2008 | Fischperer | |
| 2003/0227269 A1* | 12/2003 | Fischperer | 318/135 |
| 2006/0096495 A1* | 5/2006 | Fischperer | 104/281 |
| 2006/0097116 A1* | 5/2006 | Fischperer | 246/468 |
| 2006/0238929 A1* | 10/2006 | Nielsen | 361/20 |

FOREIGN PATENT DOCUMENTS

| | | |
|---|---|---|
| DE | 2932549 C2 | 4/1983 |
| DE | 19922441 A1 | 11/2000 |
| EP | 1657108 A1 | 5/2006 |
| GB | 1422331 A | 1/1976 |

(Continued)

*Primary Examiner* — Walter Benson
*Assistant Examiner* — Gabriel Agared
(74) *Attorney, Agent, or Firm* — Laurence A. Greenberg; Werner H. Sterner; Ralph E. Locher

(57) ABSTRACT

A device for supplying energy to a long stator winding having multiple winding sections. The device includes an energy source, a supply line connected to the energy source, section switches that are connected to the supply line and that each have a connection for connecting the switch to one winding section each. The device is configured to enable reactive (idle) power compensation independently of the closed-loop control of the energy source. The device for the reactive power compensation is configured to adjust the impedance of the device.

5 Claims, 2 Drawing Sheets

FOREIGN PATENT DOCUMENTS

| | | |
|---|---|---|
| JP | 55026025 A | 2/1980 |
| JP | 60167605 A | 8/1985 |
| JP | 7288902 A | 10/1995 |
| JP | 9104263 A | 4/1997 |
| JP | 11355913 A | 12/1999 |
| RU | 2212086 C2 | 9/2003 |

\* cited by examiner

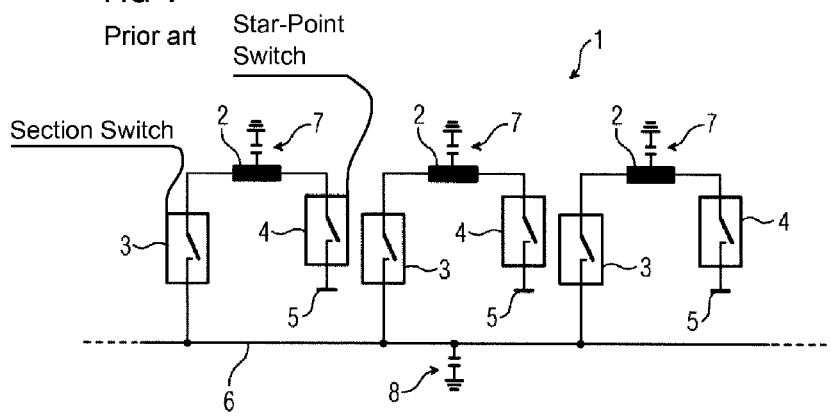
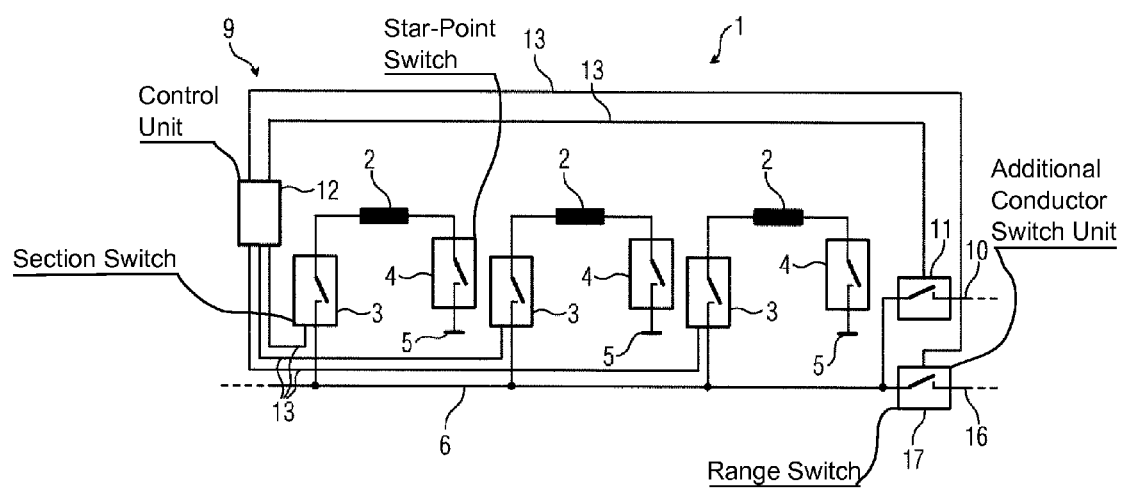

DEVICE FOR SUPPLYING ENERGY TO A LONG STATOR WINDING HAVING MULTIPLE WINDING SECTIONS

BACKGROUND OF THE INVENTION

Field of the Invention

The invention relates to an apparatus for supplying power to a long stator winding which has a plurality of winding sections, having an energy source, a supply line which is connected to the energy source, section switches which are connected to the supply line and each has a connection for connection to in each case one winding section.

One such apparatus is already known from the prior art. By way of example, apparatuses are described for supplying power to a magnetic levitation railroad and have been implemented, for example, in Shanghai, China, in which the drive is not arranged in the rail vehicle, which moves at the speed of travel. Instead of this, the drive is accommodated in the track and comprises a long stator motor, which is characterized essentially by the long stator winding.

FIG. 1 schematically illustrates an apparatus, which is known from the prior art, for supplying power to a magnetic levitation railroad. As can be seen, the long stator winding 1 is subdivided into a plurality of winding sections 2, with the winding sections 2 being directly connected to one another in the track, which is not illustrated in any more detail in the figure. The input side of each winding section 2 is connected to a section switch 3, and each winding section 2 is connected to a star-point switch 4 at its end remote from the section switch 3. In its closed position, the star-point switch 4 connects the winding section 2 to a star point 5. The section switch 3 is in contrast used for connecting the winding section 2 which is in each case associated with it to a power supply cable 6, which is connected to a converter, which is not illustrated in the figure, as an energy source. The long stator winding 1 has to be subdivided into winding sections 2 since, otherwise, the entire long stator winding 1 would have to be excited over its entire length, resulting in high energy losses. When one section switch 3 and one star-point switch 4 are switched on at the same time, this in contrast leads to excitation of a selected winding section 2 of limited length, in which a magnetic traveling field is produced as a function of the converter drive. The traveling field interacts with supporting and guide magnets which are arranged on the vehicle side, resulting in the vehicle being driven electrodynamically. As soon as the driven vehicle is no longer located above the winding section 2, the section switch 3 and the star-point switch 4 are opened.

In addition to its resistive/inductive impedance with respect to the ambient potential, each winding section 2 also has a capacitive impedance. A capacitance 7 is therefore schematically associated with each winding section 2, in each case, in FIG. 1. A corresponding situation applies to the supply line 6, whose capacitance 8 is distributed over its entire length. According to the prior art, one winding section 2 has essentially until now been connected to the supply line 6. The respectively connected winding section 2 represents a highly inductive load. This therefore results in a phase shift between the drive current and the drive voltage, resulting in the production of reactive power. This inductive reactive power cannot be compensated for adequately by the capacitance 8 of the supply line 6 and the capacitance 7 of the respectively connected winding section 2, thus resulting, according to the prior art, in an additional load on the drive system, because of the reactive power. This reactive power can be actively compensated for in some converters by expedient drive regulation, although this places a load on the drive system.

BRIEF SUMMARY OF THE INVENTION

The object of the invention is therefore to provide an apparatus of the type mentioned initially, which allows the reactive power to be compensated for independently of the energy source regulation.

The invention achieves this object by means for reactive power compensation (power factor correction), which are designed to adjust the impedance of the apparatus.

According to the invention, the impedance of the power supply apparatus according to the invention is adjusted such that the reactive power created when driving is compensated for in the desired manner. For the purposes of the invention, components of the apparatus which are provided in any case are connected with a capacitive effect, in order to compensate for the inductively acting winding section 2 that is connected. This reduces the load on the energy source, that is to say normally a converter which feeds electrical power into the supply conductor. According to the invention, the converter can therefore be regulated independently of the respective impedance of the apparatus when driving, and is therefore more efficient.

According to one preferred refinement of the invention, the means for power factor correction have a control unit which is designed to open or close at least some of the section switches. This results in the impedance of the apparatus being influenced by the winding sections of the long stator, which are provided in any case. The solution is therefore extremely cost-effective. For example, if the capacitive impedance of the overall apparatus is intended to be increased, the control unit closes a number of section switches, which are connected to an open star-point switch via the associated winding section, until the sum of the capacitances of the winding sections which are connected in this way, plus the capacitive impedance of the supply line and of the winding section 3 through which current is being passed, corresponds approximately to the inductive impedance of the winding section through which current is being passed.

The control unit is advantageously connected to measurement sensors which produce measurement signals and has internal control logic which is designed to open or close the section switches which are connected to the control unit, as a function of adjustment parameters and on the basis of the measurement signals. According to this advantageous refinement, the reactive current component of the apparatus during operation, that is to say while power is being supplied, is determined on the basis of the measurement sensors. By way of example, the measurement sensors are current and voltage measurement devices, which detect the current and the voltage in each phase of the supply conductor and determine said reactive current component in an already known manner on the basis of these measurement signals. Furthermore, the control unit has adjustment parameters which, for example, contain information on the respective magnitude of the capacitive impedance of the remaining winding sections, through which no current is currently being passed, and the magnitude of the capacitive impedance of the supply conductor. This data or these adjustment parameters allows or allow the reactive power to be compensated for as accurately as possible, by means of a simple computation rule.

At least one additional conductor switching unit, which is connected to the control unit, is expediently provided, wherein each additional conductor switching unit is connected to an additional conductor whose impedance is available to the control unit as an adjustment parameter. According to this advantageous further development, the variability and therefore the matching accuracy of the impedance to the respective requirements are enhanced.

Furthermore, a reactance unit, which is connected to the supply power, is advantageous in order to further improve the variability. By way of example, an additional capacitor or else a coil may be used as the reactance unit. However, in contrast to this, active reactance units are also provided, which have a plurality of capacitive impedances, such as condensers, and a switching unit. By way of example, the switching unit is connected to the control unit, as a result of which said capacitive impedance can be connected in its entirety or in parts in parallel with the winding section through which current is in each case being passed.

In other words, by way of example, the reactance unit can be connected via a reactance switch to the supply unit, in parallel with the winding section through which current is being passed, with the reactance switching unit in turn being connected to the control unit.

It should be mentioned at this point that any design of switching units may be used for the purposes of the invention. For example, both mechanical and semiconductor switches may be used for the purposes of the invention.

Further expedient refinements and advantages of the invention are the subject matter of the following description of exemplary embodiments of the invention with reference to the figures of the drawing, in which the same reference symbols refer to components having the same effect, and in which:

BRIEF DESCRIPTION OF THE SEVERAL VIEWS OF THE DRAWING.

FIG. 1 shows a schematic illustration of an apparatus according to the prior art, FIG. 2 shows a schematic illustration of one exemplary embodiment of the apparatus according to the invention.

DESCRIPTION OF THE INVENTION

Figure 3:
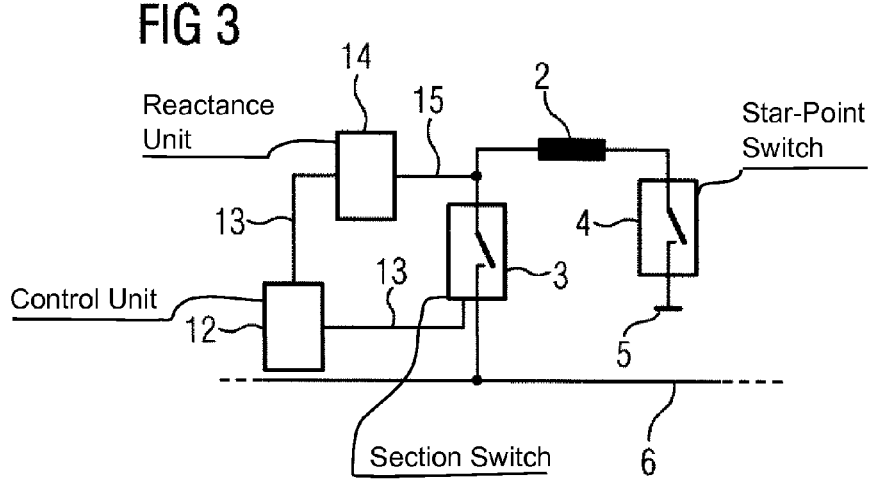
FIG. 3 shows a further exemplary embodiment of the apparatus according to the invention.

FIG. 1 shows an apparatus according to the prior art, which has already been described in detail further above, as a result of which there is no need to describe it in detail at this point.

FIG. 2 shows one exemplary embodiment of the apparatus 9 according to the invention, which is once again intended to supply power to a long stator winding 1 composed of a plurality of winding sections 2. The apparatus comprises a supply line 6, which is connected via an additional conductor 10 and an additional conductor switching unit 11 to an energy source which is a converter, which is not illustrated in the figure, wherein the converter is connected via a direct-current circuit or a DC voltage intermediate circuit to a further converter, which itself is connected to an alternating-current electrical power supply system. It is also possible to connect a further supply line 16 to the already mentioned supply line 6 via a range switch 17, which further supply line 16 likewise supplies a long stator winding 2 and likewise has winding sections which can be correspondingly connected. However, these are not illustrated in the figure, for clarity reasons.

As in the case of the prior art, a section switch 3 and a star-point switch 4 are provided in order to pass current through a winding section 2. When the section switch 3 and the star-point switch 4 are closed, a current flows from the energy source via the additional line 10, the closed additional conductor switch unit 11, the supply line 6, the closed section switch 3 into the respective winding section 2, and from there via the star-point switch 4 to the star point 5 which, for example, is grounded.

In order to prevent high losses, only one winding section 2 is generally ever connected to the supply line 6 on one side and to the star point 5 on the other side. The section switch 3 and the star-point switch 4 of the other winding sections through which no current is intended to be passed are in contrast generally open. This also applies to the range switch 17 which may be provided. In order to compensate for the inductive impedance of the winding section 2 through which current is in each case being passed, a control unit 12 is provided, and is connected to the section switches 3 via a respective signal line 13. Furthermore, the control unit 12 is also connected to the additional conductor switching units 11 and to the range switch 17 via a signal line 13. For power factor correction, the control unit 12 closes a specific number of section switches 3 and/or additional conductor switching units 11. In this case, the section switches 3 which are operated are associated with winding sections 2 through which no current is being passed, that is to say whose star-point switch 4 is open, as a result of which its capacitive impedance 7 can be used for power factor correction without this leading to an unintentional current flow through further winding sections 2. In order to notify the position of the respective star-point switch 4 to the control unit 12, the control unit 12 is also connected to the star-point switches 4 by a signal line, although this is not illustrated in FIG. 1, for clarity reasons.

In order to decide how many section switches 3 the control unit 12 should close when the star-point switches 4 are open, for power factor correction, the control unit 12 is connected to measurement sensors which are not illustrated in the figures. In the illustrated exemplary embodiment in FIG. 2, the measurement sensors detect current and voltage on the supply line 6. For clarity reasons, the figures show only one phase of the supply line, which has a total of three phases, and in each case only one pole of the respective switch or of the respective switch unit. This applies in a corresponding manner to the long stator winding 1 with the winding sections 2. However, at this point, it should be noted that the measurement sensors each detect current and voltage on a phase basis, as a result of which the control unit 12 can use the measurement signals obtained to determine the reactive power in the supply line 6 while power is being supplied to the long stator winding 1. Furthermore, the control unit 12 has adjustment parameters, that is to say for example indications relating to the impedance of a winding section 2 which is not energized but can be connected. Internal control logic in the control unit 12 uses this information to decide which section switches 3 and which additional conductor switching units 11 and range switches 17 are closed for power factor correction. It should be noted that a range switch 17 can be used to include further winding sections 2 of another long stator section 2 of the type described above for power factor correction.

FIG. 3 shows a further exemplary embodiment of the apparatus according to the invention, in which the control unit 12 is connected to a reactance unit 14. The reactance unit 14 is connected to the winding section 2 via an electrical conductor 15. By way of example, the reactance unit 14 has a switching unit, which is not illustrated in the figures but can be closed when required by the control unit 12, as well as a capacitive unit, such as a capacitor connected in star, or the like. The control unit 12 can therefore increase the capacitive impedance of the apparatus by connection of the capacitive unit of the reactance unit 14, and can therefore compensate for the inductive reactive power requirement.

Figure 4:
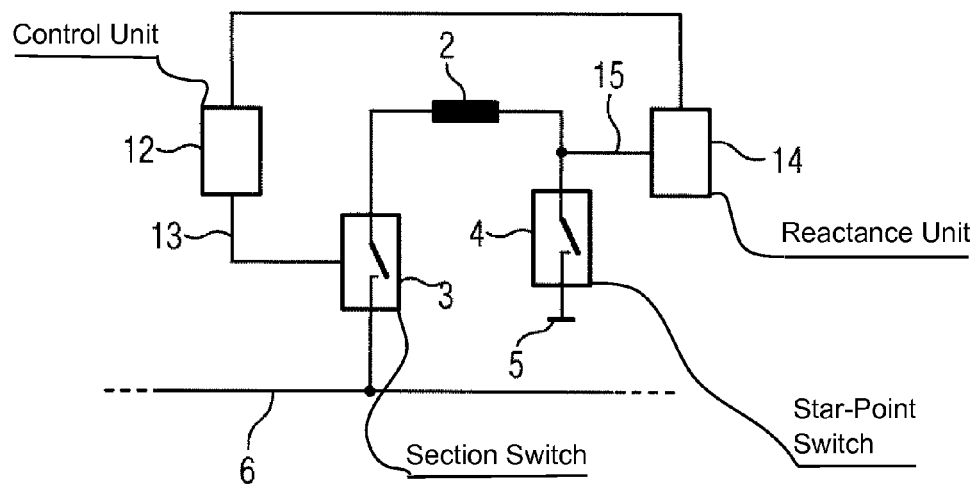
FIG. 4 shows a further exemplary embodiment of the apparatus according to the invention.

FIG. 4 shows an exemplary embodiment corresponding to FIG. 3, but in which the reactance unit 14 is arranged on the star-point side of the winding section 2, that is to say between the actual winding section 2 and the star-point switch 4.

The invention claimed is:

1. An apparatus for supplying power to a long stator winding formed with a plurality of winding sections, the apparatus comprising:

an energy source and a supply line connected to said energy source;

a plurality of section switches connected to said supply line and each having a connection to a respective one of the winding sections of the stator winding; and reactive power compensation means connected to and configured to adjust an impedance of the apparatus, said reactive power compensation means including a control unit configured to open or close at least some of said section switches, said control unit being connected to measurement sensors generating measurement signals, and said control unit including internal control logic configured to open or close said section switches that are connected to said control unit, as a function of adjustment parameters and based on the measurement signals.

2. The apparatus according to claim 1, which comprises at least one additional conductor switching unit connected to said control unit, wherein each additional conductor switching unit is connected to one additional conductor having an impedance that is available to said control unit as an adjustment parameter.

3. The apparatus according to claim 1, which comprises at least one range switching unit connected to said control unit and connected to a second supply line having an impedance that is available to said control unit as an adjustment parameter.

4. The apparatus according to claim 1, which further comprises a reactance unit connected to said supply line.

5. The apparatus according to claim 4, which further comprises a reactance switching unit for connecting said reactance unit to said supply line.

* * * * *